(12) United States Patent
Veilleux, Jr.

(10) Patent No.: US 8,572,974 B2
(45) Date of Patent: Nov. 5, 2013

(54) VARIABLE SPEED AND DISPLACEMENT ELECTRIC FLUID DELIVERY SYSTEM FOR A GAS TURBINE ENGINE

(75) Inventor: Leo J. Veilleux, Jr., Wethersfield, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 1354 days.

(21) Appl. No.: 12/533,194

(22) Filed: Jul. 31, 2009

(65) Prior Publication Data

US 2011/0023444 A1 Feb. 3, 2011

(51) Int. Cl.
*F02C 1/00* (2006.01)

(52) U.S. Cl.
USPC .................................. 60/734; 60/39.08

(58) Field of Classification Search
USPC ............. 60/734, 39.08, 39.281; 184/6.11
See application file for complete search history.

(56) References Cited

U.S. PATENT DOCUMENTS

| | | | |
|---|---|---|---|
| 2,511,150 A | 6/1950 | Edwards | |
| 2,672,010 A | 3/1954 | Newcomb | |
| 2,672,278 A | 3/1954 | Newcomb | |
| 3,067,693 A | 12/1962 | Lambeck | |
| 3,527,054 A | 9/1970 | Hemsworth | |
| 3,618,710 A | 11/1971 | De Lisse et al. | |
| 4,205,525 A | 6/1980 | Hamburg et al. | |
| 4,208,871 A | 6/1980 | Riple, Jr. | |
| 4,354,345 A | 10/1982 | Dreisbach, Jr. et al. | |
| 4,741,152 A | 5/1988 | Burr et al. | |
| 5,020,314 A * | 6/1991 | Brophy et al. | 60/786 |
| 5,152,141 A | 10/1992 | Rumford et al. | |
| 5,214,984 A | 6/1993 | Sano | |
| 5,285,626 A | 2/1994 | Leeson | |
| 5,513,732 A | 5/1996 | Goates | |
| 5,545,014 A | 8/1996 | Sundberg et al. | |
| 5,555,722 A | 9/1996 | Mehr-Ayin et al. | |
| 5,610,341 A | 3/1997 | Tortora | |
| 6,470,666 B1 | 10/2002 | Przytulski et al. | |
| 6,719,543 B2 | 4/2004 | Gentile et al. | |
| 7,386,983 B2 | 6/2008 | Miller | |
| 7,500,365 B2 | 3/2009 | Suciu et al. | |
| 2001/0047647 A1 | 12/2001 | Cornet | |
| 2005/0166570 A1 | 8/2005 | Granitz et al. | |
| 2007/0169997 A1 | 7/2007 | Delaloye | |
| 2009/0152051 A1 | 6/2009 | Glahn et al. | |
| 2009/0199823 A1 * | 8/2009 | Mahoney et al. | 123/497 |

FOREIGN PATENT DOCUMENTS

| | | |
|---|---|---|
| EP | 0 694 120 B1 | 5/2001 |
| JP | 6-307325 A | 1/1994 |
| WO | WO9408176 | 4/1994 |

OTHER PUBLICATIONS

Combined Search and Examination Report Under Sections 17 and 18(3) for European Patent Application GB1012927.8.

* cited by examiner

*Primary Examiner* — Phutthiwat Wongwian
*Assistant Examiner* — Vikansha Dwivedi
(74) *Attorney, Agent, or Firm* — Kinney & Lange, P.A.

(57) ABSTRACT

A fluid delivery system in a gas turbine engine includes an electric motor, a first fluid pump system and a second fluid pump system. The electric motor operates at a variable speed. The first pump system includes a first pump driven by the motor to deliver a first fluid to the gas turbine engine. The second pump system includes a second pump driven by the motor to deliver a second fluid to the gas turbine engine, the second pump having a variable displacement.

17 Claims, 1 Drawing Sheet

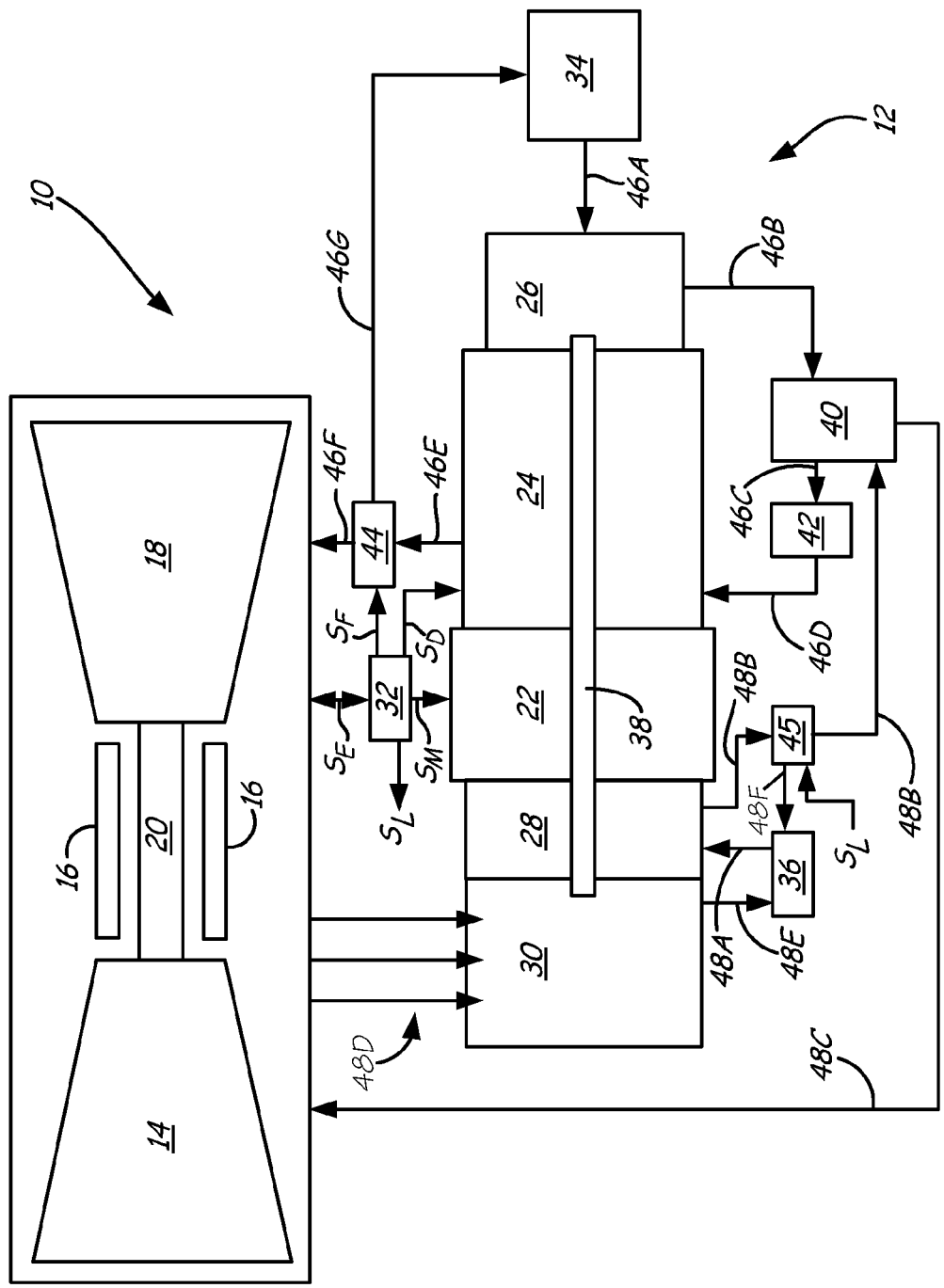

VARIABLE SPEED AND DISPLACEMENT ELECTRIC FLUID DELIVERY SYSTEM FOR A GAS TURBINE ENGINE

BACKGROUND

The present invention is related to accessory systems for gas turbine engines, and more particularly to fluid pump systems for gas turbine engines.

Gas turbine engines operate by passing a volume of gas through a series of compressors and turbines in order to produce rotational shaft power. The shaft power is used to turn a turbine for driving a compressor to generate compressed air. The compressed air is mixed with a fuel and combusted within a combustor to generate high energy gases. The high energy gases sustain rotation of the turbines and produce thrust. Additionally, the shaft power can be used to rotate a fan to produce additional thrust.

In aircraft engines, the shaft power is typically used to provide power to accessory systems needed to operate the engine and the aircraft. For example, accessory gear boxes provide input power to generators for providing electrical power to the engine, as well as input power to pumps for systems that provide fuel and lubricant to the engine. Such gear boxes are typically driven through a tower shaft connected to a turbine shaft in the engine. As such, the accessory gear box operates at speeds directly corresponding to operational speed of the engine. Thus, the displacements of fuel pumps and lubrication pumps driven by the accessory gear box must be sized to meet required output according to engine speed parameters, rather than fuel and lubrication requirements. As such the displacements are often oversized for their expected operating ranges. The problem is compounded as typical fuel and lubrication systems often require ancillary scavenge pumps and boost pumps, respectively, in addition to the primary fuel pump and lubrication pump. Furthermore, tower shafts and gear boxes required for pump operation extend from engines in such a manner so as to require large engine nacelles that increase the frontal area of some airplanes, increasing drag and reducing fuel efficiency.

In order to reduce problems associated with engine nacelle sizing, the pump gearbox can be eliminated, which also uncouples the pump systems from the turbine shaft and mitigates pump displacement design limitations. The pump systems can be powered with a separate electric drive motor for each pump. The desired amount of fluid flow from each pump can then be provided independent of engine speed. Furthermore, each pump and motor can be incorporated into the engine nacelle without unduly increasing the frontal area of the engine and hence the airplane. Such a system, however, adds significant weight and cost to the engine. Alternatively, each pump could be driven by a single electric motor with the addition of metering valves and regulators. Such a system enables control over the motor speed independent of engine speed, but suffers from the same sizing and displacement problems as gearbox-driven pumps; each pump is sized based on the single speed at which the electric motor operates rather than individual flow requirements. There is, therefore, a need for lightweight and compact pump systems that allow for greater control of flow from individual pumps.

SUMMARY

The present invention is directed to a fluid delivery system in a gas turbine engine. The fluid delivery system includes an electric motor, a first fluid pump system and a second fluid pump system. The electric motor operates at a variable speed. The first pump system includes a first pump driven by the motor to deliver a first fluid to the gas turbine engine. The second pump system includes a second pump driven by the motor to deliver a second fluid to the gas turbine engine, the second pump having a variable displacement.

BRIEF DESCRIPTION OF THE DRAWINGS

The sole FIGURE shows a schematic diagram of a gas turbine engine having an electric fluid delivery system of the present invention.

DETAILED DESCRIPTION

The sole FIGURE shows gas turbine engine 10 having electric fluid delivery system 12 of the present invention. Gas turbine engine 10 includes compressor 14, combustor 16, turbine 18 and shaft 20. Electric fluid delivery system 12 includes motor 22, fuel pump 24, boost pump 26, lubrication pump 28 and scavenge pump 30. Gas turbine engine 10 communicates with electric fluid delivery system 12 through electronic controller 32. Electric fluid delivery system 12 is connected to sources of fluid used in gas turbine engine 10, such fuel tank 34 and lubricant tank 36.

Compressor 14 intakes and compresses a gas, such as atmospheric air, and forces the compressed gas into combustor 16. Combustor 16 also receives fuel from fuel pump 24. Within combustor 16, the compressed gas and fuel are mixed and ignited to force expanded gas into turbine 18. Turbine 18 extracts energy from the expanded gas to cause rotation of shaft 20 before the gas is expelled from engine 10 as exhaust. Shaft 20, in turn, powers compressor 14 and other subsidiary systems. For example, power from shaft 20 is typically used to turn a tower shaft and gear system for providing input to other accessory systems, such as a generator (not shown). Power from the generator is used to power electric motor 22 of fluid delivery system 12. Using pumps 24-30 driven by shaft 38 of motor 22, electric fluid delivery system 12 dispenses fuel and lubricant to engine 10 based on engine needs, as determined by electronic controller 32.

Controller 32 receives various engine control signals $S_E$ from various sensors, such as pressure and temperature sensors, within engine 10 to determine various engine needs based on performance demands being placed on engine 10. For example, the amount of fuel needed by engine 10 depends on, among other things, a throttle position actuated by an operator. Similarly, as engine demands increase, temperatures and speeds within engine 10 rise, requiring greater amounts of lubricant. For example, shaft 20, which connects compressor 14 and turbine 18, is support by bearings that require lubrication to facilitate smooth rotation of compressor 14 and turbine 18. The bearings also require lubrication to prevent excessive temperatures at the bearing-shaft interfaces. The amounts of fuel and lubricant needed by engine 10 vary at different operating speeds of engine 10 and shaft 20. Likewise, the rates at which the needs for such fluids change over the operating range of the engine are different. Using engine control signals $S_E$, controller 32 adjusts various operating parameters, such as variable vane positions, of engine 10 based on sensed operating conditions and fuel and lubricant demands of engine 10. Fluid delivery system 12 includes a fuel pump system and a lubrication pump system that produce independently variable flows of fuel and lubricant, respectively, as called for by signals from controller 32.

Fuel pump 24 and boost pump 26 together comprise a fuel pump system that delivers fuel from fuel tank 34 to engine 10. Lubrication pump 28 and scavenge pump 30 comprise a lubrication pump system that delivers lubricant from lubricant tank 36 to engine 10 and returns the lubricant back to tank 36. The fuel pump system produces a one way flow of fuel from fuel tank 34 to engine 10 as fuel is consumed by engine 10. The lubrication pump system comprises a closed loop system that delivers lubricant from lubricant tank 36 to engine 10 and returns heated lubricant back to lubricant tank 36. Heat exchanger 40 is connected to a fluid circuit from each of the fuel pump system and the lubrication pump system to transfer heat between the lubricant and the fuel.

The fuel pump system, which includes filter 42 and fuel control 44, pressurizes a fuel system within engine 10 to deliver fuel from fuel tank 34 to engine 10. Boost pump 26 is connected through fuel line 46A to fuel tank 34 and provides fuel to fuel pump 24 through fuel lines 46B, 46C and 46D. Although any type of pump can be used, in one embodiment, boost pump 26 comprises a fixed displacement centrifugal pump that uses a radial impeller to accelerate fuel from fuel tank 34. Fuel from boost pump 26 is directed through heat exchanger 40 and filter 42 before being input to fuel pump 24. The fuel absorbs heat from the lubricant within heat exchanger 40 to improve performance of engine 10. For example, the fuel is heated to prevent fuel icing, improve engine efficiency, and cool engine oil and lubricant. Filter 42 removes contaminants and particulate matter from the fuel before being delivered to fuel pump 24. Boost pump 26 provides a minimum level of pressurized fuel to fuel pump 24 to, among other things, prevent cavitations within fuel pump 24 at high speeds. Fuel pump 24 comprises a variable displacement pump that delivers fuel to engine 10 through fuel lines 46E and 46F, based on engine fuel demands determined by controller 32. In one embodiment, pump 24 comprises a rotary vane pump that is electrically actuated by displacement signal $S_D$ from controller 32. In various embodiments of the invention, output of fuel pump 24 is metered using fuel control 44, which receives fuel signal $S_F$ from engine controller 32 and comprises various active or passive valves. However, because fuel pump 24 comprises a variable displacement pump and is self-metering, separate fuel metering is not needed.

The lubrication pump system, which includes lubrication control 45, pressurizes a lubrication system within engine 10 to deliver and return lubricant from lubricant tank 36 to engine 10. Lubrication pump 24 draws lubricant from lubricant tank 36 through lubrication line 48A. Lubrication pump 28 comprises a fixed displacement pump that delivers lubricant from lubricant tank 36 to engine 10. In one embodiment, lubrication pump 28 comprises a gear pump, although other pumps, such as G-rotor vane pumps, can be used. In various embodiments of the invention, output of lubrication pump 28 is metered using lubrication control 45, which receives lubrication signal $S_L$ from engine controller 32 and comprises various active or passive valves. Lubricant is distributed to heat exchanger 40 through lubrication line 48B. Heat exchanger 40 removes heat from the lubricant before it is provided to engine 10 through lubrication line 48C such that the lubricant can be used to cool and lubricate components of gas turbine engine 10. For example, the lubricant is provided to bearings that support shaft 20. Lubricant from the bearings and other components is heated within engine 10 through friction and exposure to elevated ambient temperatures. The lubricant is collected in various lubricant sumps (not shown) within engine 10. Scavenge pump 30 comprises a fixed displacement pump that collects lubricant from within the sumps and returns the lubricant to lubricant tank 36 through lubrication lines 48D. In one embodiment, scavenge pump 30 comprises a gear pump, although other pumps, such as G-rotor vane pumps, can be used. Scavenge pump 30 discharges collected lubricant into lubricant tank 36 through lubrication line 48E.

Electric motor 22 comprises a variable speed motor that controls output of fuel pump 24, boost pump 26, lubrication pump 28 and scavenge pump 30 through coupling to shaft 38. Fuel pump 24, boost pump 26, lubrication pump 28 and scavenge pump 30 are mechanically coupled to electric motor 22. The specific coupling of the pumps to electric motor can vary in different embodiments of the invention. In one embodiment, each pump is directly connected to shaft 38. In another embodiment, fuel pump 24 and lubrication pump 28 are directly connected to shaft 38, while boost pump 26 and scavenge pump 30 are driven by coupling to fuel pump 24 and lubrication pump 28, respectively. Electric motor 22 can be configured to operate the pumps in a single shaft or dual shaft configuration, as shown in the sole FIGURE. The rotational speed of shaft 38 governs the output, or capacity based on displacement, of fuel pump 24, boost pump 26, lubrication pump 28 and scavenge pump 30. The rotational speed of shaft 38 is adjusted using motor signal $S_M$ based on demands of engine 10, as determined by controller 32 through engine signals $S_E$.

For any given operational speed of engine 10, a corresponding flow of lubricant and fuel is needed. Ideally, an engine control system would have complete control over the output of each pump to meet engine needs, such as by varying the pump speed based on the pump displacement. As discussed above, however, such systems would be expensive and heavy. Fluid delivery system 12 includes multiple degrees of freedom to determine flow rates of fuel and lubricant from fuel pump 24, boost pump 26, lubrication pump 28 and scavenge pump 30.

A first degree of freedom is provided by the fixed displacements of boost pump 26, lubrication pump 28 and scavenge pump 30, which are sized based on the expected operating ranges of engine 10 and the corresponding fluid flow demands. In order to meet the fluid flow demands, the capacity of each pump is controlled by the operating rate of motor 22. Thus, the speed of motor 22 provides a second degree of freedom. The variable displacement of fuel pump 24 provides a third degree of freedom. Thus, the outputs of both the fuel pump system and the lubrication pump system are dependent on the selected displacement of their respective pumps, and are variable based on the speed of motor 22. The output of the fuel pump system, however, is additionally variable based on a degree of freedom independent of the operation of the lubrication pump system, the variable displacement of fuel pump 24. In other embodiments, however, the variable displacement pump can be included in the lubrication pump system, such as for lubrication pump 28. In yet other embodiments, both fuel pump 24 and lubrication pump 28 comprise variable displacement pumps.

Controller 32 determines fuel and lubricant needs of engine 10 during operation using engine signals $S_E$. Specifically, controller 32, using sensor input from engine 10 and other indicators, determines how much fuel flow is needed from fuel pump 24 and how much lubricant flow is needed from lubrication pump 28. Additionally, controller 32 determines how much fuel flow is needed from boost pump 26 to prime fuel pump 24, and how much lubricant flow is needed from scavenge pump 30 to recover, or scavenge, lubricant from various engine compartments such as bearing compartments. For example, boost pump 26 needs to provide more fuel to fuel pump 24 to maintain pressurization at high fuel flow rates. Also, although lubrication pump 28 and scavenge pump 30 typically operate at similar capacities, scavenge pump 30 may need to operate at a higher capacity than lubrication pump 28 to accommodate air brought into the lubrication system at the sumps and other locations.

Output of fuel pump 24 and lubrication pump 28 are primary in that engine 10 cannot operate without such outputs. Output of boost pump 26 and scavenge pump 30 are secondary considerations in that operation of engine 10 cannot be efficiently sustained without such outputs. Thus, output demands of fuel pump 24 and lubrication pump 28 typically dictate operation of motor 22 by controller 32. As such, either one of or both of fuel pump 24 and lubrication pump 28 can be configured with variable displacement valves to adjust instantaneous fuel and/or lubricant demands of engine 10. The demands of boost pump 26 and scavenge pump 30 can be controlled by adjusting the speed of motor 22.

In response to the determined fluid needs, controller 32 operates motor 22 and the displacement of fuel pump 24 to provide the requisite volumes of fluid. Specifically, controller 32 operates motor 22 at a speed sufficient to satisfy the minimum fluid delivery demand by engine 10 for each of lubrication pump 28, fuel pump 24, scavenge pump 30 and boost pump 26. In other words, controller 32 operates motor 22 at the highest speed required to satisfy the minimum output required for each of lubrication pump 28, fuel pump 24, scavenge pump 30 and boost pump 26 as determined by the respective displacement of each pump. Based on the speed of motor 22, controller 32 adjusts the displacement of fuel pump 24 to satisfy instantaneous fuel demand of engine 10. Controller 32 also adjusts the displacement of lubrication pump 28 in embodiments when lubrication pump 28 is additionally or alternatively configured as a variable displacement pump. Using controller 32, the speed of motor 22 and the displacement of fuel pump 24 are continuously adjusted based on demands of engine 10. As such, system 12 includes two variable degrees of freedom that can be adjusted by an engine controller to more closely tailor the output of pumps 24-30 based on engine needs. Thus, the capacities of pumps 24-30 can be more closely sized to actual engine demands, reducing excess weight within system 12 and engine 10. Furthermore, this eliminates production of fluid flows beyond the needs of engine 10, which reduces the efficiency of fluid delivery system 12 and ultimately engine 10. For example, overproduction of fluid flow results in wasted energy in the form of waste heat.

Excess capacity provided by each pump can be accommodated for in various ways. For example, excess fuel or lubricant can simply be rerouted back to fuel tank 34 or lubricant tank 36 using bypass lines and metering valves. Fuel metering valve 44 may direct any excess fuel capacity provided by pump 24 back to fuel tank 34 through fuel line 46G. Metering valve 45 may direct any excess lubricant capacity provided by pump 28 back to lubricant tank 36 through line 48F. Other pumps within system 12 may be provided with similar systems. However, system 12 is capable of accommodating excess fuel and lubricant flows due to the multiple degrees of available for controlling fluid flows.

For example, if motor 22 is operating at speeds to satisfy demands on lubrication pump 28, fluid flows from the other pumps can be accommodated by selecting or adjusting the other degrees of freedom. Production of fuel flow by fuel pump 24 can simply be reduced by adjusting the displacement of fuel pump 24 with displacement signal $S_D$. The lubricant flow required of scavenge pump 30 is directly related to the lubricant flow of lubrication pump 28, as scavenge pump 30 need only replenish lubricant tank 36 with lubricant that has been displaced by lubrication pump 28, even if the total capacity of scavenge pump 30 is higher than that of lubrication pump 28 due to the presence of air in the lubrication system. The displacement of scavenge pump 30 can be sized with respect to lubrication pump 28 to provide the requisite capacity to pump lubricant and air out of engine 10 such that the demands of scavenge pump 30 will be met if motor 22 is operating to satisfy demands of lubrication pump 28. Similarly, the displacement of boost pump 26 can be selected such that demands of boost pump 26 will be met or exceeded if motor 22 is operating at speeds to satisfy demands on fuel pump 24, as the fuel required of boost pump 26 to prime fuel pump 24 is small compared to the fuel required of fuel pump 24 to supply engine 10.

A designer of electric fluid delivery system 12 is thus presented with multiple variables with which to control the various fluid flows within gas turbine engine 10. Namely, the capacities of boost pump 26, lubrication pump 28 and scavenge pump 30 can be varied based on the speed of motor 22 in view of their selected fixed displacements, while the capacity of fuel pump 24 can be varied based on its variable displacement and the speed of motor 22. The displacements of each pump within system 12 can thus be more closely matched to the capacities required during operation of engine 10, while still requiring only a single drive input. Thus, the size and weight of system 12 can be kept small, and the efficiencies of system 12 and engine 10 can be increased. Furthermore, system 12 can effectively operate with only a single variable displacement pump, keeping the cost of system 12 down.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A fluid delivery system for a gas turbine engine, the fluid delivery system comprising:
   an electric motor having a variable speed;
   a first pump system having:
      a first pump driven by the motor to deliver a first fluid to the gas turbine engine, wherein the first pump comprises a fixed displacement lubrication pump driven at the variable speed to provide a lubricant from a lubricant tank to the gas turbine engine; and
      a fixed displacement scavenge pump driven at the variable speed, wherein the scavenge pump returns the lubricant from the gas turbine engine to the lubricant tank; and
   a second pump system having:
      a second pump driven by the motor to deliver a second fluid to the gas turbine engine, the second pump having a variable displacement; and
      a fixed displacement boost pump driven at the variable speed, wherein the boost pump provides fuel from a fuel tank to the second pump;
      wherein second pump comprises a fuel metering pump driven at the variable speed, wherein the fuel metering pump forwards the fuel from the boost pump to the gas turbine engine.

2. The fluid delivery system of claim 1 and further comprising an electronic controller to control speed of the electric motor and displacement of the second pump.

3. The fluid delivery system of claim 2 and further comprising metering valves connected to the electronic controller and an output of the first pump and an output of the second pump.

4. The fluid delivery system of claim 2 wherein the electronic controller:
adjusts an operating speed of the electric motor to a speed that satisfies a minimum fluid delivery demand by the engine for each of the lubrication pump, the fuel metering pump, the scavenge pump and the boost pump; and
adjusts a displacement of the fuel metering pump to satisfy instantaneous fuel demand of the engine.

5. The fluid delivery system of claim 1 wherein:
the fuel metering pump comprises a rotary vane pump;
the boost pump comprises a centrifugal pump; and
the lubrication pump and the scavenge pump comprise gear pumps.

6. The fluid delivery system of claim 1 and further comprising a fuel filter positioned between a boost pump outlet and a fuel metering pump inlet.

7. The fluid delivery system of claim 6 and further including a fuel-lubricant heat exchanger comprising:
a first circuit connected to the first fluid system between the gas turbine engine and a lubrication pump outlet; and
a second circuit connected to the second fluid system between the boost pump outlet and the fuel metering pump inlet.

8. A gas turbine engine comprising:
a compressor for compressing gas within the gas turbine engine;
a fuel system for providing a fuel to the gas turbine engine;
a combustor that mixes the fuel with the compressed gas and ignites the mixture of fuel and gas, causing the mixture to expand;
a turbine for extracting energy from the expanding mixture;
a lubrication system for providing a lubricant to the compressor and turbine;
fluid pump system for pressurizing the fuel system and the lubrication system, the fluid pump system comprising:
an electric motor having a variable speed;
a first pump driven at the speed of the electric motor, the first pump having a variable displacement;
a second pump driven at the speed of the electric motor;
a third pump for providing input to the first pump, wherein the third pump is driven at the speed oldie electric motor; and
a fourth pump for providing input to the second pump, wherein fourth pump is driven at the speed of the electric motor;
wherein the first and third pump move fuel within the gas turbine engine and the second and fourth pump move lubricant within the gas turbine engine, or the first and third pump move lubricant within the gas turbine engine and the second and fourth pump move fuel within the gas turbine engine.

9. The gas turbine engine of claim 8 and further comprising an electronic control device for adjusting speed of the electric motor and displacement of the first pump.

10. The gas turbine engine of claim 9 wherein the electronic control device:
adjusts an operating speed of the electric motor to a speed that satisfies the minimum fluid flow demands by the engine of each of the first pump, the second pump, the third pump and the fourth pump; and
adjusts a displacement of the first pump to satisfy an instantaneous demand of the engine.

11. The gas turbine engine of claim 10 wherein the second pump comprises a variable displacement pump connected to the electronic control device to adjust a displacement of the second pump.

12. The gas turbine engine of claim 10 and further comprising a metering valve connected to the electronic control device and an output of either the first pump or the second pump.

13. The gas turbine engine of claim 10 and further including a fluid heat exchanger comprising:
a first circuit connected to the fluid pump system inline with the first pump and the third pump; and
a second circuit connected to the fluid pump system inline with the second pump and the fourth pump.

14. The gas turbine engine of claim 8 and further comprising a filter positioned between a third pump and the first pump.

15. The gas turbine engine of claim 8 wherein:
wherein first pump provides the lubricant from the lubrication system to the gas turbine engine;
wherein the third pump returns the lubricant from the gas turbine engine to the lubrication system;
wherein the fourth pump provides the fuel from the fuel system to the second pump; and
wherein the second pump forwards the fuel from the fourth pump to the gas turbine engine.

16. The gas turbine engine of claim 8 wherein:
wherein second pump provides the lubricant from the lubrication system to the gas turbine engine;
wherein the fourth pump returns the lubricant from the gas turbine engine to the lubrication system;
wherein the third pump provides the fuel from the fuel system to the first pump; and
wherein the first pump forwards the fuel from the third pump to the gas turbine engine.

17. A fluid delivery system for a gas turbine engine, the fluid delivery system comprising:
an electric motor having a variable speed;
a first pump system having:
a first pump driven by the motor to deliver a first fluid to the gas turbine engine, wherein the first pump comprises a variable displacement lubrication pump driven at the variable speed to provide a lubricant from a lubricant tank to the gas turbine engine; and
a fixed displacement scavenge pump driven at the variable, speed, wherein the scavenge pump returns the lubricant from the gas turbine engine to the lubricant tank; and
a second pump system having:
a second pump driven by the motor to deliver a second fluid to the gas turbine engine, the second pump having a fixed displacement; and
a fixed displacement boost pump driven at the variable speed, wherein the boost pump provides fuel from a fuel tank to the second pump;
wherein second pump comprises a fuel metering pump driven at the variable speed, wherein the fuel metering pump forwards the fuel from the boost pump to the gas turbine engine.

* * * * *

UNITED STATES PATENT AND TRADEMARK OFFICE
CERTIFICATE OF CORRECTION

PATENT NO. : 8,572,974 B2
APPLICATION NO. : 12/533194
DATED : November 5, 2013
INVENTOR(S) : Leo J. Veilleux, Jr.

It is certified that error appears in the above-identified patent and that said Letters Patent is hereby corrected as shown below:

In the Claims

Col. 7, Line 47, Claim 8
  Delete "oldie"
  Insert --of the--

Signed and Sealed this
Twenty-fourth Day of December, 2013

Margaret A. Focarino
*Commissioner for Patents of the United States Patent and Trademark Office*